US012671677B2

(12) United States Patent
Davis et al.

(10) Patent No.: US 12,671,677 B2
(45) Date of Patent: Jun. 30, 2026

(54) BIDIRECTIONAL DATA OBFUSCATION AND ATOMIZATION WITHIN UNSECURED FRAGMENTED RUNTIME ENVIRONMENTS

(71) Applicant: Cisco Technology, Inc., San Jose, CA (US)

(72) Inventors: Kyzer Ryan Davis, Fuquay-Varina, NC (US); Gonzalo A Salgueiro, Raleigh, NC (US); Magnus Mortensen, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 300 days.

(21) Appl. No.: 18/360,356

(22) Filed: Jul. 27, 2023

(65) Prior Publication Data

US 2025/0039154 A1 Jan. 30, 2025

(51) Int. Cl.
*H04L 9/40* (2022.01)
(52) U.S. Cl.
CPC ................................. *H04L 63/0407* (2013.01)
(58) Field of Classification Search
CPC .................................................. H04L 63/0407
See application file for complete search history.

(56) References Cited

U.S. PATENT DOCUMENTS

| | | | |
|---|---|---|---|
| 9,356,943 B1 | 5/2016 | Lopilato et al. | |
| 11,211,140 B1* | 12/2021 | Satpathy | ................. G06F 21/31 |
| 2003/0084326 A1 | 5/2003 | Tarquini | |

| | | | |
|---|---|---|---|
| 2003/0101358 A1 | 5/2003 | Porras et al. | |
| 2006/0265446 A1* | 11/2006 | Elgressy | ............... G06F 21/445 |
| | | | 709/200 |
| 2010/0054459 A1* | 3/2010 | Ciet | .......................... H04L 9/00 |
| | | | 380/28 |
| 2010/0146583 A1* | 6/2010 | Prehofer | ................ G06Q 30/02 |
| | | | 726/1 |
| 2015/0281265 A1 | 10/2015 | Belenky | |
| 2018/0150645 A1* | 5/2018 | Toshok | ............... G06F 21/6254 |
| 2018/0373885 A1* | 12/2018 | Arad | .................... G06F 21/629 |
| 2020/0106787 A1 | 4/2020 | Galinski et al. | |

(Continued)

OTHER PUBLICATIONS

Rahman et al., "Preserve Your Privacy with PCO: A Privacy Sensitive Architecture for Context Obfuscation for Pervasive E-Community Based Applications", Aug. 2010, IEEE Second International Conference on Social Computing, pp. 41-48 (Year: 2010).*

*Primary Examiner* — Kenneth W Chang
(74) *Attorney, Agent, or Firm* — Edell, Shapiro & Finnan, LLC

(57) ABSTRACT

A method performed at an analysis server, comprising: identifying data objects used by logic configured to produce alternative outcomes depending on first values of the data objects; obfuscating the data objects to produce obfuscated data objects that are related to, but do not identify, the data objects; sending, to a target device, individual requests for second values of the obfuscated data objects; receiving, from the target device, individual responses to the individual requests, wherein the individual responses include obfuscated second values that are related to but do not identify the second values; and evaluating the logic using the obfuscated second values in place of the first values, and without de-obfuscating the obfuscated second values, to produce one of the alternative outcomes.

20 Claims, 8 Drawing Sheets

GENERATE ATOMIC CHUNKS (DATA OBJECTS) USED BY LOGIC TO EVALUATE TO OUTCOME

SEND RELEVANT ATOMIC REQUESTS ALONG WITH BOGUS REQUESTS TO TARGET DEVICE

ANALYSIS SERVER PROMPTED TO RETRIEVE ATOMIC RESULTS FROM TARGET DEVICE

SEND ATOMIC RESPONSES (ATOMIC RESULTS) TO ANALYSIS SERVER

RETRIEVE ATOMIC RESULTS FROM LOGS/DATA, OBFUSCATE, ENCRYPT

DE-OBFUSCATE RESULTS FOR USER

(56)　　　　　　References Cited

U.S. PATENT DOCUMENTS

| | | |
|---|---|---|
| 2020/0210608 A1 | 7/2020 | Toshok et al. |
| 2020/0265159 A1* | 8/2020 | Schmatz ................. H04L 9/008 |
| 2022/0229929 A1* | 7/2022 | Kayyoor .............. G06F 16/245 |
| 2023/0078607 A1* | 3/2023 | Fong ....................... G06F 21/62 |
| | | 726/26 |

* cited by examiner

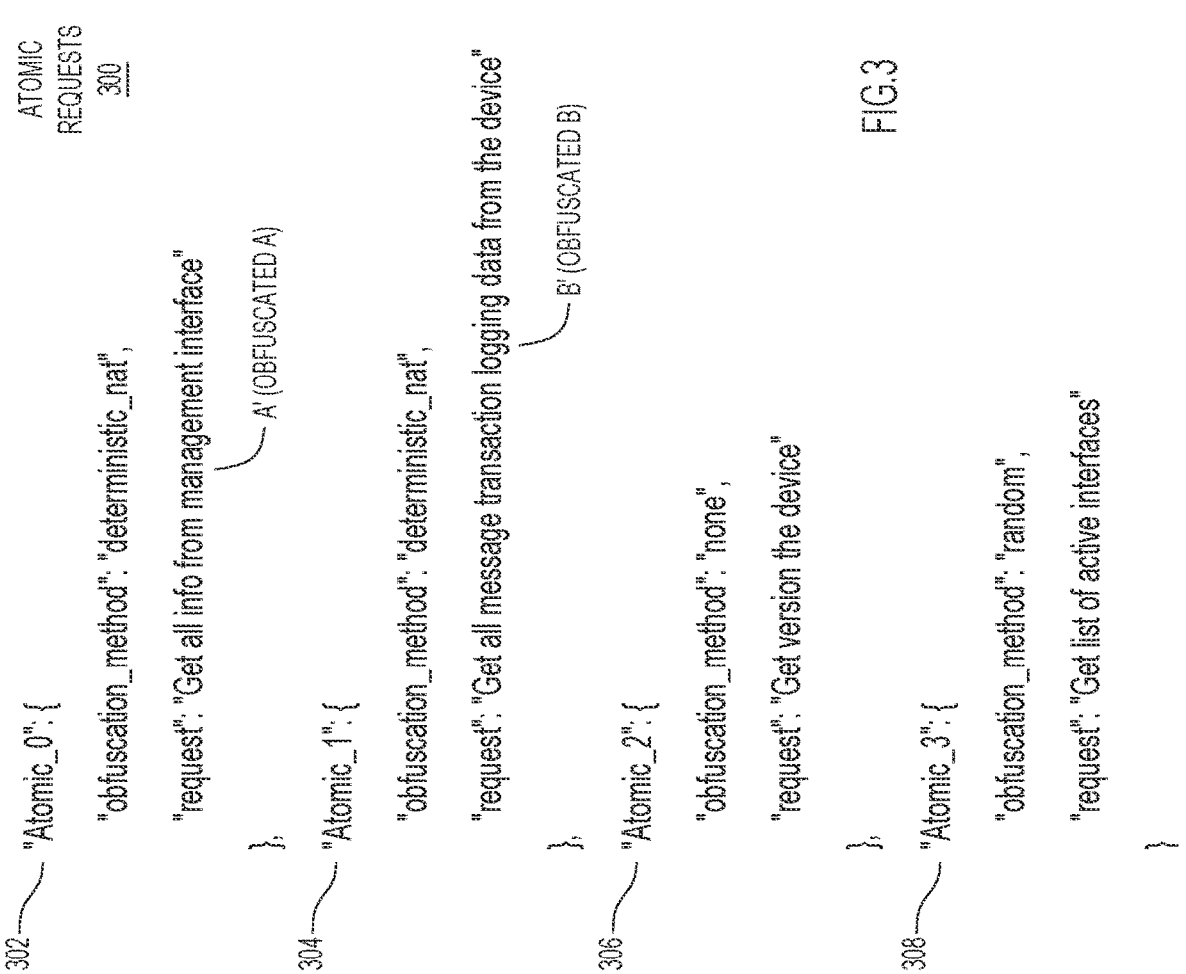

ATOMIC
REQUESTS
300

302 — "Atomic_0": {

"obfuscation_method": "deterministic_nat",

"request": "Get all info from management interface"

A' (OBFUSCATED A)

},

304 — "Atomic_1": {

"obfuscation_method": "deterministic_nat",

"request": "Get all message transaction logging data from the device"

B' (OBFUSCATED B)

},

306 — "Atomic_2": {

"obfuscation_method": "none",

"request": "Get version the device"

},

308 — "Atomic_3": {

"obfuscation_method": "random",

"request": "Get list of active interfaces"

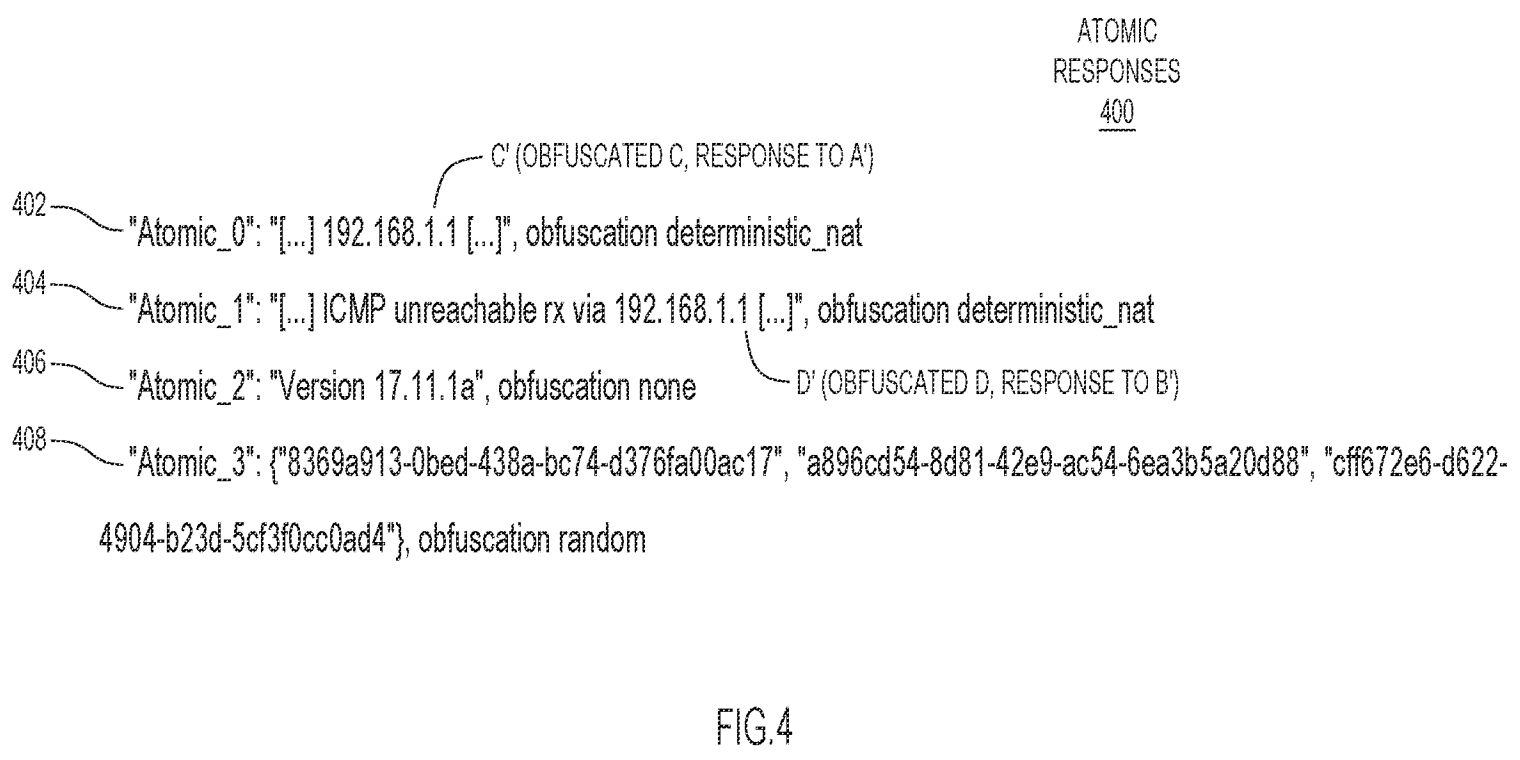

ATOMIC
RESPONSES
400

C' (OBFUSCATED C, RESPONSE TO A')

402 —— "Atomic_0": "[...] 192.168.1.1 [...]", obfuscation deterministic_nat

404 —— "Atomic_1": "[...] ICMP unreachable rx via 192.168.1.1 [...]", obfuscation deterministic_nat 406 —— "Atomic_2": "Version 17.11.1a", obfuscation none

D' (OBFUSCATED D, RESPONSE TO B')

408 —— "Atomic_3": {"8369a913-0bed-438a-bc74-d376fa00ac17", "a896cd54-8d81-42e9-ac54-6ea3b5a20d88", "cff672e6-d622-4804-b23d-5cf3f0cc0ad4"}, obfuscation random

FIG.4

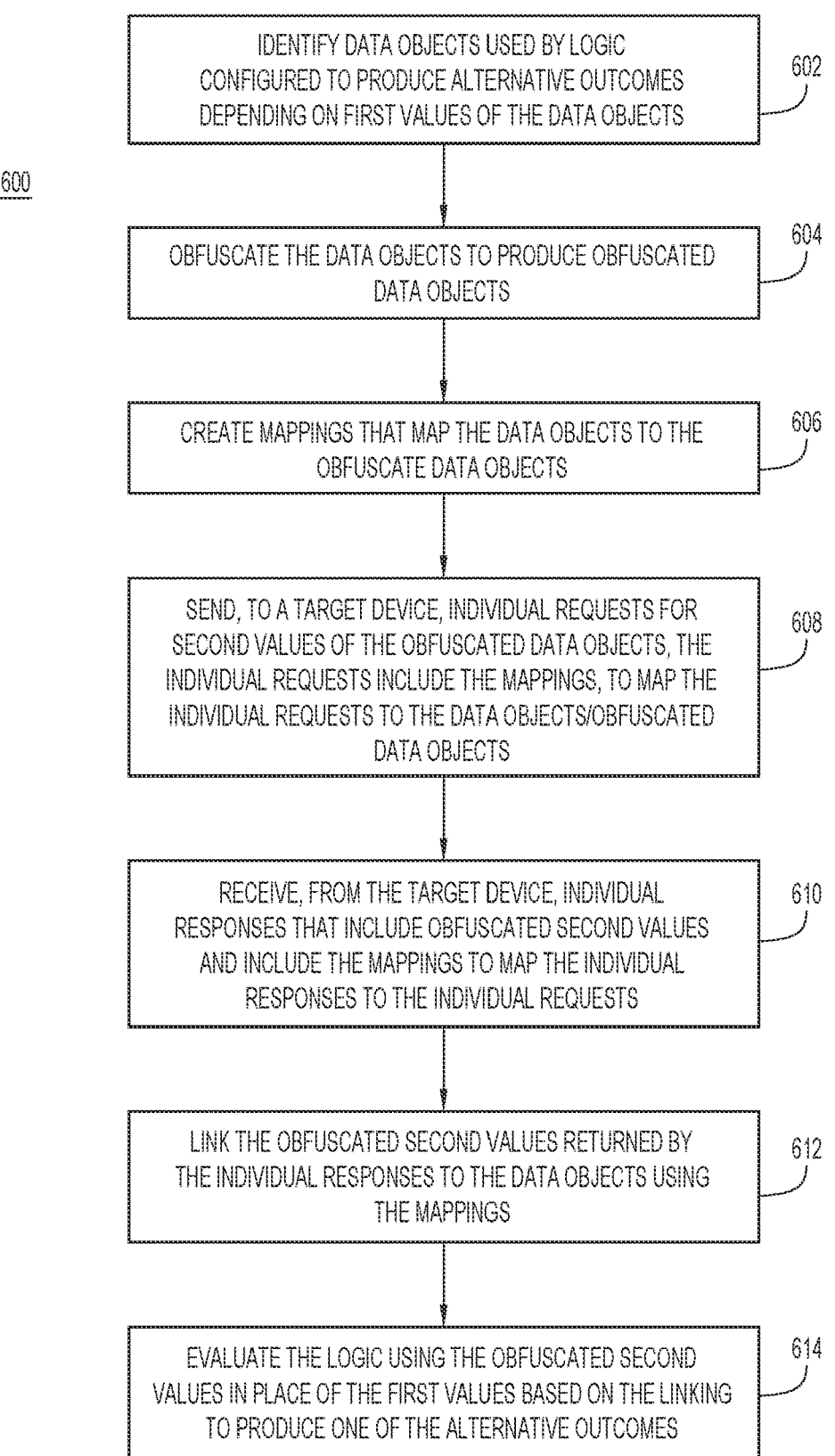

600

IDENTIFY DATA OBJECTS USED BY LOGIC CONFIGURED TO PRODUCE ALTERNATIVE OUTCOMES DEPENDING ON FIRST VALUES OF THE DATA OBJECTS — 602

OBFUSCATE THE DATA OBJECTS TO PRODUCE OBFUSCATED DATA OBJECTS — 604

CREATE MAPPINGS THAT MAP THE DATA OBJECTS TO THE OBFUSCATE DATA OBJECTS — 606

SEND, TO A TARGET DEVICE, INDIVIDUAL REQUESTS FOR SECOND VALUES OF THE OBFUSCATED DATA OBJECTS, THE INDIVIDUAL REQUESTS INCLUDE THE MAPPINGS, TO MAP THE INDIVIDUAL REQUESTS TO THE DATA OBJECTS/OBFUSCATED DATA OBJECTS — 608

RECEIVE, FROM THE TARGET DEVICE, INDIVIDUAL RESPONSES THAT INCLUDE OBFUSCATED SECOND VALUES AND INCLUDE THE MAPPINGS TO MAP THE INDIVIDUAL RESPONSES TO THE INDIVIDUAL REQUESTS — 610

LINK THE OBFUSCATED SECOND VALUES RETURNED BY THE INDIVIDUAL RESPONSES TO THE DATA OBJECTS USING THE MAPPINGS — 612

EVALUATE THE LOGIC USING THE OBFUSCATED SECOND VALUES IN PLACE OF THE FIRST VALUES BASED ON THE LINKING TO PRODUCE ONE OF THE ALTERNATIVE OUTCOMES — 614

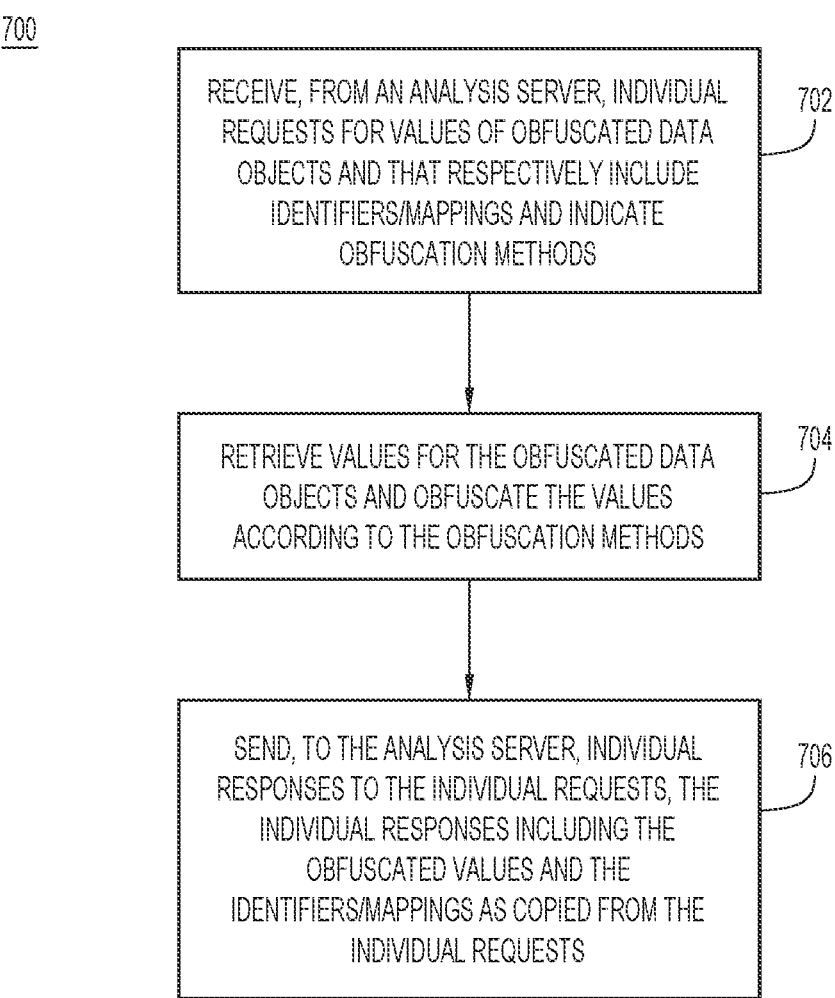

RECEIVE, FROM AN ANALYSIS SERVER, INDIVIDUAL REQUESTS FOR VALUES OF OBFUSCATED DATA OBJECTS AND THAT RESPECTIVELY INCLUDE IDENTIFIERS/MAPPINGS AND INDICATE OBFUSCATION METHODS — 702

RETRIEVE VALUES FOR THE OBFUSCATED DATA OBJECTS AND OBFUSCATE THE VALUES ACCORDING TO THE OBFUSCATION METHODS — 704

SEND, TO THE ANALYSIS SERVER, INDIVIDUAL RESPONSES TO THE INDIVIDUAL REQUESTS, THE INDIVIDUAL RESPONSES INCLUDING THE OBFUSCATED VALUES AND THE IDENTIFIERS/MAPPINGS AS COPIED FROM THE INDIVIDUAL REQUESTS — 706

FIG.7

BIDIRECTIONAL DATA OBFUSCATION AND ATOMIZATION WITHIN UNSECURED FRAGMENTED RUNTIME ENVIRONMENTS

TECHNICAL FIELD

The present disclosure relates generally to data obfuscation techniques employed in network analysis runtime environments.

BACKGROUND

Customers of network providers often have data sovereignty concerns that prevent sharing of raw data outputs (e.g., application logs, screenshots, command-line outputs) from network devices of the network providers with analysis teams of the network providers, without first obfuscating the data. Such obfuscation can skew results or render the analysis of the data invalid or misleading.

Data analysis intellectual capital (IC) (referred to simply as "IC") provided by the network provider may not be easily distributed without possible exposure of the IC to third parties, which may benefit from insight into embedded logic of the IC. Protecting the IC logic from exposure to such third parties is important to the network provider because the protection maintains the value of that IC and its competitive advantage in the marketplace.

On top of the above-mentioned challenges, the size of support datasets generated by the network devices has grown increasingly large. Common diagnostic bundles now employ multiple Gigabytes (Gigs) of data, which is costly to transmit, store, and process. Routinely transferring many Gigs of data for the purpose of diagnostic analysis is wasteful in terms of resources and time consumed.

BRIEF DESCRIPTION OF THE DRAWINGS

FIG. 3 is an illustration of atomic requests (i.e., individual data requests) generated in part based on atomic mappings (i.e., individual mappings) between data objects and obfuscated data objects, according to an example embodiment.

FIG. 4 shows atomic responses (i.e., individual data responses) that satisfy the atomic requests of FIG. 3, according to an example embodiment.

FIG. 6 is a flowchart of a method of bidirectional data obfuscation and atomization performed by an analysis server in the network runtime environment of FIG. 2, according to an example embodiment.

FIG. 7 is a flowchart of a method of bidirectional data obfuscation and atomization performed by a target device in the network runtime environment of FIG. 2, according to an example embodiment.

DETAILED DESCRIPTION

Overview

In an embodiment, a method is performed at an analysis server, the method comprising: identifying data objects used by logic configured to produce alternative outcomes depending on first values of the data objects; obfuscating the data objects to produce obfuscated data objects that are related to, but do not identify, the data objects; sending, to a target device, individual requests for second values of the obfuscated data objects; receiving, from the target device, individual responses to the individual requests, wherein the individual responses include obfuscated second values that are related to but do not identify the second values; and evaluating the logic using the obfuscated second values in place of the first values, and without de-obfuscating the obfuscated second values, to produce one of the alternative outcomes.

EXAMPLE EMBODIMENTS

Figure 1:
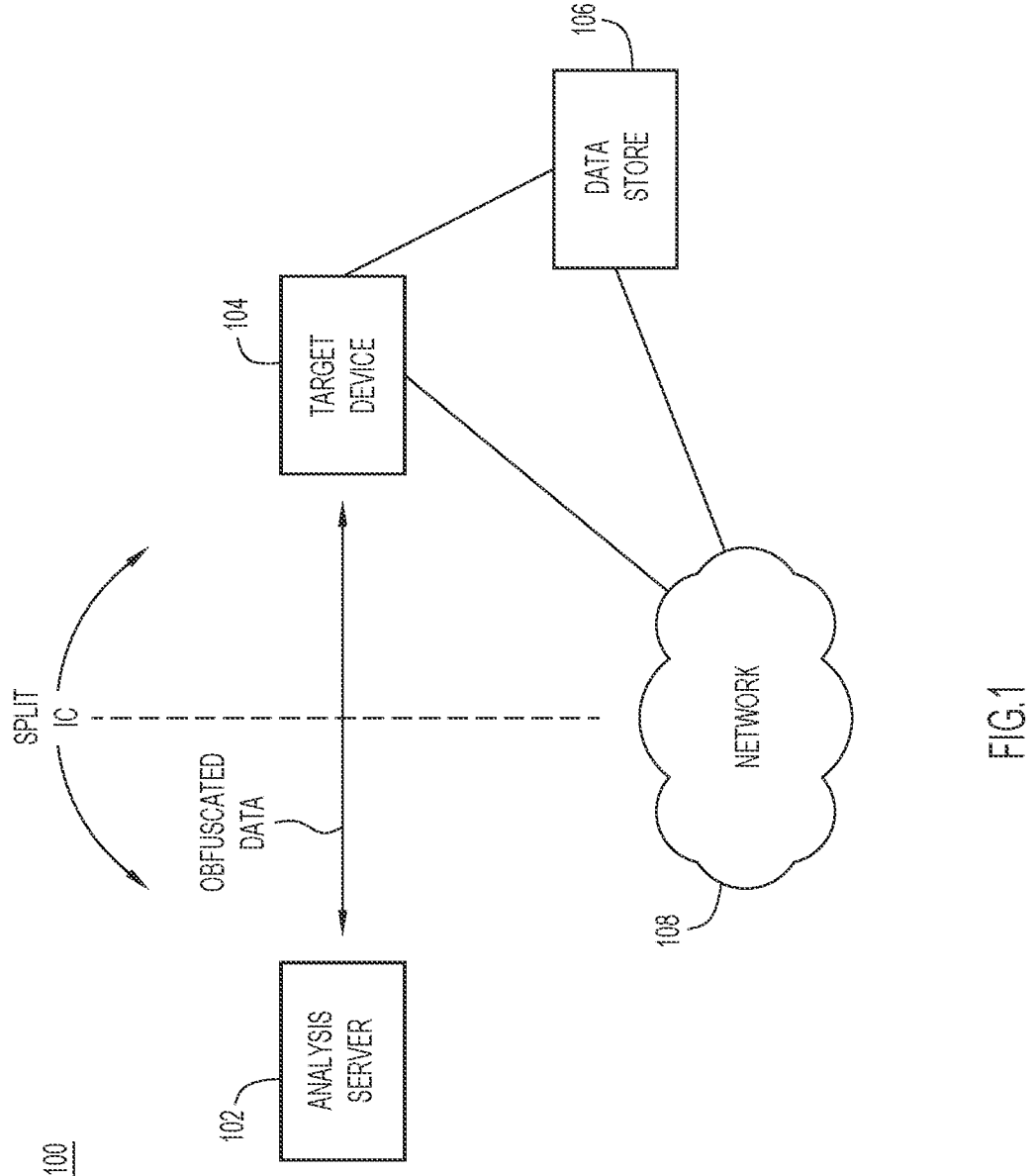
FIG. 1 is a block diagram of a network environment in which bidirectional data obfuscation and atomization within a network runtime environment may be implemented, according to an example embodiment.

FIG. 1 is a block diagram of an example network environment 100 in which embodiments directed to bidirectional data obfuscation and atomization within a network runtime environment may be implemented. "Atomization" generally means breaking down data and/or a logical relationship into individual constituent components, objects, or units. Network environment 100 includes an analysis server 102 (e.g., a diagnostic system), a target device 104, and a data store 106 configured to communicate with each other over a network 108. Network 108 may include one or more wide area networks (WANs), such as the Internet, and one or more local area networks (LANs), that convey traffic (e.g., data packets) between analysis server 102, target device 104, and data store 106 using any known or hereafter developed communication protocols, such as the transmission control protocol (TCP)/Internet Protocol (IP), and the like. Target device 104 may include a network edge compute node or a network device, such as a switch or a router, implemented in hardware or virtually, which forwards traffic over one or more networks, for example. Data store 106 may store various data compiled through operations performed by target device 104. Although shown separately in FIG. 1, data store 106 may be hosted on or integrated with target device 104, i.e., include registers, files, and the like implemented on the target device.

Analysis server 102, target device 104, and data store 106 collectively implement a data analysis runtime environment, which employs intellectual capital (IC) by which analysis server 102 performs data analysis on data solicited from data store 106 through target device 104 and network 108. To obfuscate the IC from an observer, embodiments presented herein employ a split architecture that fragments the IC between analysis server 102 and target device 104. In the split architecture, analysis server 102 hosts data analysis logic and analysis-side data obfuscation logic, while target device 104 implements target device-side data obfuscation logic. In the event that a third party accesses logic hosted at target device 104, the IC logic hosted at analysis server 102 remains protected. In addition, to protect customer data, analysis server 102 and target device 104 exchange data in an obfuscated form in a way that permits the analysis server to use the data in the obfuscated form for contextual computational analysis but not to ascertain original (non-obfuscated) values of the data, nor can an observer intercept or make sense of the exchanged obfuscated data or gain useful insight into the IC.

Figure 2:
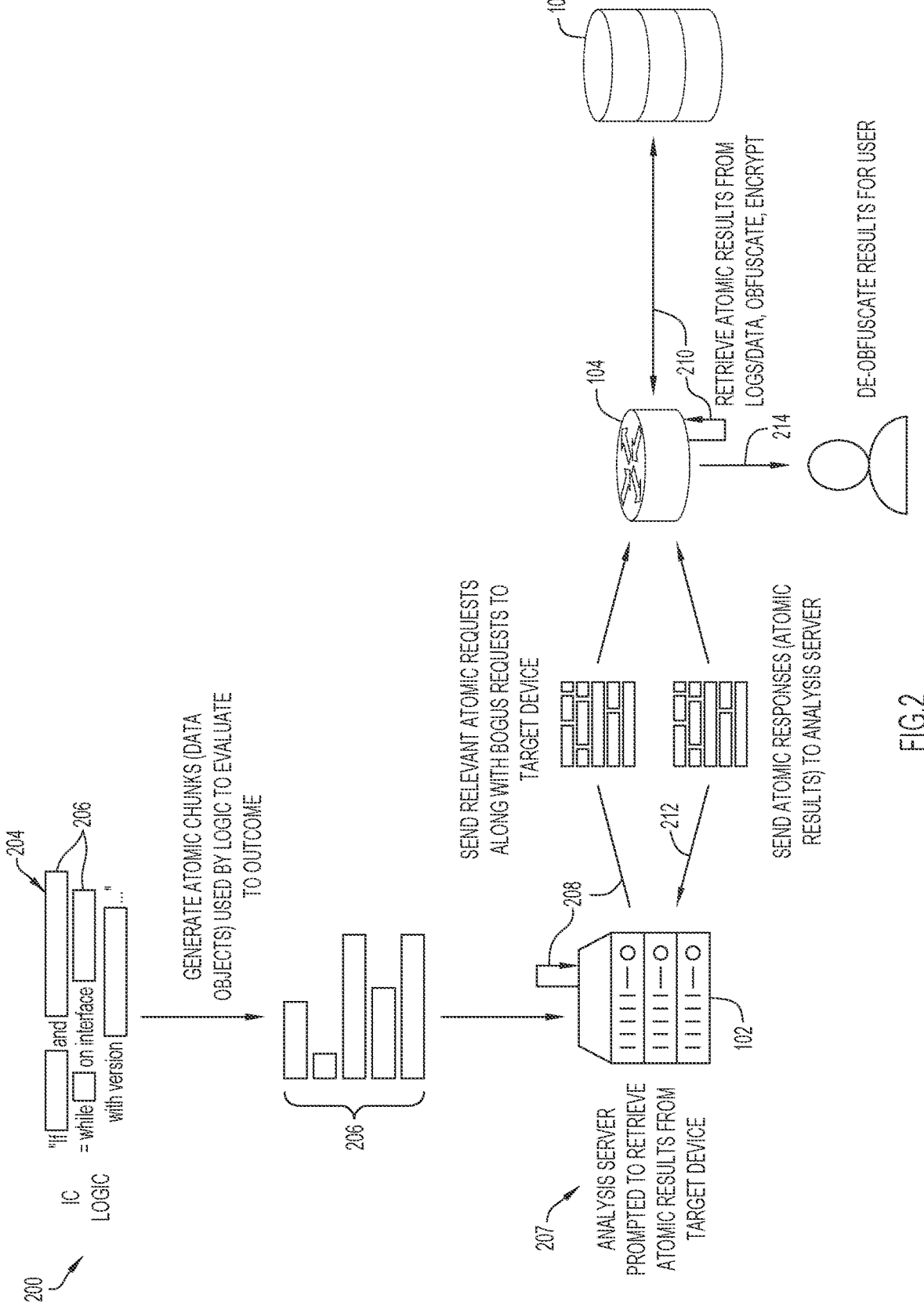
FIG. 2 is an illustration of a high-level flow diagram for a split architecture data analysis runtime environment, according to an example embodiment.

FIG. 2 is a diagram of an example operational flow 200 for the split architecture data analysis runtime environment. The example assumes that analysis server 102 performs data analysis to determine whether there is a software, network, or other type of defect affecting the runtime environment. The data analysis employs IC logic configured with a logic relationship (e.g., conditional logic) that operates on values of multiple data objects retrievable from data store 106 through target device 104 to produce conditional/alternative outcomes that depend on the values.

At 202, analysis server 102 access IC logic 204 that is to be evaluated. Example IC logic may be expressed in a form such as:

Check if management interface's IP address is observed within ICMP Unreachable system log messages and a code version is from code train 1.23.4, then flag defect as CSCxx12345: "ICMP Unreachable vulnerability for network management interface"

IC logic 204 operates on values of data objects 206 (indicated as blocks in FIG. 1) retrievable from target device 104 to produce the conditional outcome that indicates whether the defect exists.

At 204, analysis server 102 parses IC logic 204 to identify data objects 206, separately. Data objects 206 may be referred to as "atomic IC chunks" or "atoms." The term "atom" means individual and separate.

At 207, a user prompts analysis server 102 to solicit values (also referred to as "atomic results") for data objects 206, i.e., to retrieve the values corresponding to the data objects 206. In another example, analysis server 102 may automatically solicit the atomic results, without any prompt from the user.

In an embodiment, at 208, analysis server 102 obfuscates data objects 206 locally (at the analysis server) to produce obfuscated data objects corresponding to the data objects (i.e., one obfuscated data object per (original) data object). This obfuscation helps to obscure IC logic 204. The obfuscated data objects are related to their corresponding (original) data objects but are not specifically identified by the obfuscated data objects. The obfuscated data objects may incorporate their corresponding data objects along with a variety of other information. For example, a data object that is an "IP address of a management interface" on target device 104 may have a corresponding obfuscated data object that includes "all information for all interfaces of the target device." Further examples of such analysis server-side obfuscation are described below.

Analysis server 102 generates individual data requests (also referred to as "atomic requests") to retrieve values for the obfuscated data objects (i.e., one atomic request per obfuscated data object) corresponding to the data objects from target device 104. Analysis server 102 creates distinct individual mappings (also referred to as "atomic mappings") that map the data objects to the atomic requests for the obfuscated data objects that correspond to the data objects, respectively. This is referred to as "atomic mapping" of data objects 206 to the atomic requests that are configured to retrieve values for the obfuscated data objects corresponding to the data objects. Analysis server 102 populates the atomic requests with corresponding ones of the atomic mappings, which uniquely identify the atomic requests. In another embodiment in which analysis server 102 does not obfuscate the data objects, the atomic requests request values for the data objects directly.

Analysis server 102 also populates the atomic requests with obfuscate commands/instructions that instruct target device 104 either to obfuscate values (i.e., the atomic results/data) that are retrieved by target device 104 responsive to the atomic request or to not obfuscate the values. Obfuscate commands that instruct target device 104 to obfuscate the values further define an obfuscation method, such as random obfuscation, a first type of deterministic obfuscation, a second type of deterministic obfuscation, and so on.

Analysis server 102 also purposely generates one or more spurious (e.g., bogus) atomic requests for values of spurious data objects that are not employed by IC logic 204. Analysis server 102 sends the atomic requests, including the spurious atomic requests, to target device 104 to direct the target device to retrieve the values for the obfuscated data objects and the spurious data objects. The spurious atomic requests help to further obscure actual data used by IC logic 204. The set of atomic requests may be considered a compute logic package that analysis server 102 loads onto target device 104 over a network that may be untrusted.

At 210, upon receiving the atomic requests, target device 104 retrieves, from data store 106, values (i.e., the atomic results) for the obfuscated data objects indicated in the atomic requests. Assuming the that the atomic requests specify obfuscation methods, target device 104 obfuscates the retrieved values to produce obfuscated values (i.e., obfuscated atomic results) corresponding to the obfuscated data objects. In some cases, the atomic requests may specify that no obfuscation is to be performed, in which case target device 104 does not obfuscate the retrieved values.

Target device 104 may obfuscate data in multiple ways, including:

a. Deterministically by obfuscating data into "similar enough" matches. That is, an IP address still looks and conveys that it is an IP address but the target device has transposed or translated the IP address into a different (mapped) IP value that replaces the original IP address. This is useful for systems where the context or unique format of the original data is important but the value itself is not important.

b. Randomly by obfuscating data into strings of pseudo-random characters, or an encrypted value, such that the "meaning" of the original data is fully lost. This is useful for systems where complete anonymity is desired but signaling some unique data is desired.

In both scenarios, the original value and its obfuscated value are saved to an encrypted mapping file for future use in other IC endeavors or to undo the obfuscation when data analysis results are provided to a client. As mentioned above, target device 104 may deterministically obfuscate similar items in similar ways. For example, an IP route object can be changed to a value and a singular IP object within that route can be changed to follow the same logic which maintains linking or correlating properties between the two. In another example, a domain in an email address object can be changed to a value and all emails from that domain can be changed to a similar value or the same value further preserving the identifiable nature of the original object without sharing the original value. Any identifier of an object, such as IPv4/IPv6 addresses, routes, interface names, phone numbers, emails, media access control (MAC) address, serial numbers, addresses, and hostnames/fully qualified domain names (FQDNs), for example, may be subjected to deterministic or random obfuscation. Such examples are described below in connection with FIG. 5.

Target device 104 generates individual data responses (referred to as "atomic responses") to the atomic requests (i.e., one atomic response per atomic request), respectively. Target device 104 populates each atomic response with (i) the obfuscated value(s) for the obfuscated data object of the atomic request that is satisfied by the atomic response, (ii) an obfuscation status that indicates whether the values are obfuscated, and (iii) a copy of the atomic mapping from the atomic request that is satisfied by the atomic response. In this way, each atomic mapping uniquely links or correlates an atomic request to a corresponding atomic response, and in turn links or correlates each data object to the corresponding obfuscated data object and obfuscated values for the obfuscated data object. Target device 104 also generates spurious atomic responses to the spurious atomic requests, and populates the spurious atomic responses with the corresponding values.

At 212, target device 104 sends to analysis server 102 the atomic responses, including the spurious atomic responses. Upon receiving the atomic responses, analysis server 102 links or correlates the atomic responses and the obfuscated values conveyed by the atomic responses to their corresponding data objects based on the atomic mappings of the atomic responses. Based on the linking/correlation results, analysis server 102 evaluates IC logic 204 using the obfuscated values of the obfuscated data objects in place of values for data objects 206 to which the obfuscated values are linked, to produce an outcome. Analysis server 102 evaluates IC logic 204 without de-obfuscating the obfuscated values.

At 214, target device 104 additionally sends the obfuscated values, within an obfuscated outcome, to a user for de-obfuscation by the user.

An example of operational flow 200 is described below. The example presents atomic mapping of data objects (also referred to as "data sets") to atomic requests for values of obfuscated data objects as performed at analysis server 102, deterministic obfuscation of retrieved values for the obfuscated data objects as performed at target device 104, and evaluation of IC logic using the obfuscated values without de-obfuscation as performed at the analysis server.

Analysis server 102 is configured to answer the following query: has a specific vulnerability, CSCxx12345, been leveraged against target device 104?

Analysis server 102 parses the query to identify the following data objects (also referred to as "datasets" in this example) to be used by the analysis server to answer the query:

a. Dataset 1 (i.e., data object 1): management interface IP address.
b. Dataset 2 (i.e., data object 2): Logs for internet control message protocol ICMP unreachable messages.
c. Dataset 3 (i.e., data object 3:): Current version of the device.

To answer the query, analysis server 102 evaluates the logic:

Management interface IP address will show in logging data of received ICMP unreachable message and the device is running an affected version.

For purposes of analysis, the following deterministic features should be maintained across the datasets:

a. An IP address remains in an IP format for regex running on the dataset (i.e., data objects). To find an IP address, the IP address should not be a random string of characters.
b. For relationships between values of datasets to be determinable across the datasets, underlying personally identifiable information (PII)/sensitive data should not be randomized to ensure that values that should be the same across different datasets are the same, not different.

Table 1 below shows full atomic mappings for dataset 1 and dataset 2, created by analysis server 102. Each row in Table 1 represents an atomic mapping.

TABLE 1

| | | | Requests |
|---|---|---|---|
| A | Atomic_0 | Logic | IP Address of management interface |
| A' | Atomic_0 | Request | Get all info from management interface |
| B | Atomic_1 | Logic | Logs that have ICMP Unreachable Received |
| B' | Atomic_1 | Request | Get all message transaction logging data from the device |

| | | | Responses |
|---|---|---|---|
| C | Atomic_0 | Data | Real on-box data from management interface |
| C' | Atomic_0 | Response | Deterministically obfuscated data from management interface |
| D | Atomic_1 | Data | Real on-box message transaction logging data from the device |
| D' | Atomic_1 | Response | Deterministically obfuscated message transaction logging data from the device |

Note:
For simplicity, E, E' (Dataset 3), F, F', G, G', H, and H' are omitted.

As shown in Table 1 (where "→" means "maps to"):

a. A→A' thus "Atomic_0" is created for dataset 1 and maps data object="IP address of management interface") to atomic request="Get all info from management interface." Atomic_0 maps data object "IP address of management interface" to obfuscated data object "all info from management interface"; the latter is related to the former (and should include the former), but does not specifically identify the former.

a. B→B' thus "Atomic_1" is created for dataset 2 and mapped to "Get all message transaction logging data from the device." Thus, a data object "Logs that have ICMP Unreachable Received" is obfuscated to an obfuscated data object "All message transaction logging data from the device."

b. Atomic_2 can be used for further checking, not PII, so does need not to be changed. (Can take values of E, E').

c. Atomic_3 is junk data not used but is obfuscated by random since context is not required. (Can take value of G, G').

Based on the atomic mappings described above, analysis server 102 generates atomic requests as shown in FIG. 3, and sends the atomic requests to target device 104. In an example, the atomic requests may be sent as IP packets with source/destination IP addresses for analysis server 102/target device 104. FIG. 3 is an illustration of four atomic requests 300 generated in part based on the atomic mappings of Table 1. Atomic requests 300 include atomic requests Atomic_0 (302), Atomic_1 (304), Atomic_2 (306), and Atomic_3 (308). Each atomic request includes (i) an identifier (e.g., "Atomic_0") of the atomic request and the atomic mapping to which the atomic request pertains, (ii) identifiers of the information/values (also referred to as "data") of the obfuscated data objects to be retrieved to satisfy the atomic request, and (iii) an obfuscation command in the form of an obfuscation method that indicates a type of obfuscation to be used to obfuscate retrieved values (e.g., "deterministic," "random," and so on) or to not obfuscate the retrieved values ("none" or "null").

Atomic request Atom_1 represents an obfuscated request because the specific data of interest, i.e., the "management interface IP," forms only a small part of the full payload of the requested data (e.g., request "device.interfaces.manaegment.*"). In an alternative example, atomic request Atomic_1 may request un-obfuscated data object="management interface IP" directly (e.g., return "device.interfaces.manaegment.ip).

Analysis server 102 selects the obfuscation method listed in the atomic requests from the following multiple possible obfuscation methods that can be implemented by the analysis server:

a. Null or none—perform no obfuscation.

b. Deterministic_network address translation (NAT) (deterministic_nat)—replace IP addresses/networks by changing the re-mapping host/network address. The netmask values may not change. This may include translating IP addresses to different IP addresses.

c. Deterministic_replace—replace PII elements with a mapped version of the element such that the replacement is consistent.

d. Random—obfuscate data by randomizing the data, using encryption or other randomizing process, for example.

Upon receiving atomic requests 300, target device 104 retrieves values (i.e., data) that satisfy the atomic requests and obfuscates the data according to the obfuscation method indicated to produce obfuscated values (i.e., obfuscated data) that satisfy the atomic requests. Target device 104 obfuscates the retrieved data according to the following mappings from Table 1:

a. Target device 104 fetches underlying (sensitive) data (e.g., values) for A' (all info from management interface), which returns "raw" data C, including IP addresses that the target device does not want to share.

b. Target device 104 deterministically obfuscates C→C' and returns "Atomic_0" with values "[ . . . ] 192.168.1.1 [ . . . ]," where 192.168.1.1 was a value of 64.102.2.27 deterministically changed, and where [ . . . ] represents additional data elements or values.

c. Target device 104 fetches underlying data for B' (all message transaction logging data from the device), which returns "raw" data D, including IP addresses that the target device does not want to share.

d. Target device 104 deterministically obfuscates D→D' and returns "Atomic_1" with values "[ . . . ] ICMP unreachable rx via 192.168.1.1 [ . . . ]," where 192.168.1.1 was a value of 64.102.2.27 re-using previously known deterministically changed values.

e. Atomic_2 response can take values of F, F'.

f. Atomic_3 response can take value of H, H'.

Based on the above, target device 104 returns atomic responses that include obfuscated values (i.e., obfuscated data) including C' and D', as shown in FIG. 4. The atomic responses may be returned in IP packets, for example. FIG. 4 shows four atomic responses 400 including Atomic_0 (402), Atomic_1 (404), Atomic_2 (406), and Atomic_3 (408) that satisfy corresponding ones of the atomic requests of FIG. 3 that share the same atomic mappings identifiers. Each atomic response includes (i) an identifier (e.g., "Atomic_0") of the atomic response that is copied from the atomic request satisfied by the atomic response, (ii) the obfuscated data, and (iii) an obfuscation method copied from the atomic request. Atomic response Atomic_0 includes management interface IP address C'=192.168.1.1, which is deterministically obfuscated to hide the actual raw/original value C=64.102.2.27. Similarly, Atomic response Atomic_1 includes management interface IP address D'=192.168.1.1, which is deterministically obfuscated to hide the actual raw value D=64.102.2.27.

Upon receiving atomic responses 400, analysis server 102 links the obfuscated values from the atomic responses to corresponding data objects using the atomic mappings of Table 1, and evaluates the IC logic "management IP address will show in logging data of received ICMP unreachable message and the device is running an affected version" using the obfuscated values in place of values for the data objects based on the linking, without de-obfuscating the obfuscated values. For example, the IC logic ascertains the management interface IP address, via regex or another pattern match search method, compares obfuscated value 192.168.1.1 for Atomic_0 linked data object/obfuscated data object=management interface IP address to obfuscated value 192.168.1.1 for Atomic_1 linked data object/obfuscated data object=in ascertained ICMP unreachable received messages, recognizes the match, and then indicates a positive correlation between Atomic_0 and Atomic_1. Further logic using dataset 3 is leveraged to compute a potential final outcome.

Figure 5:
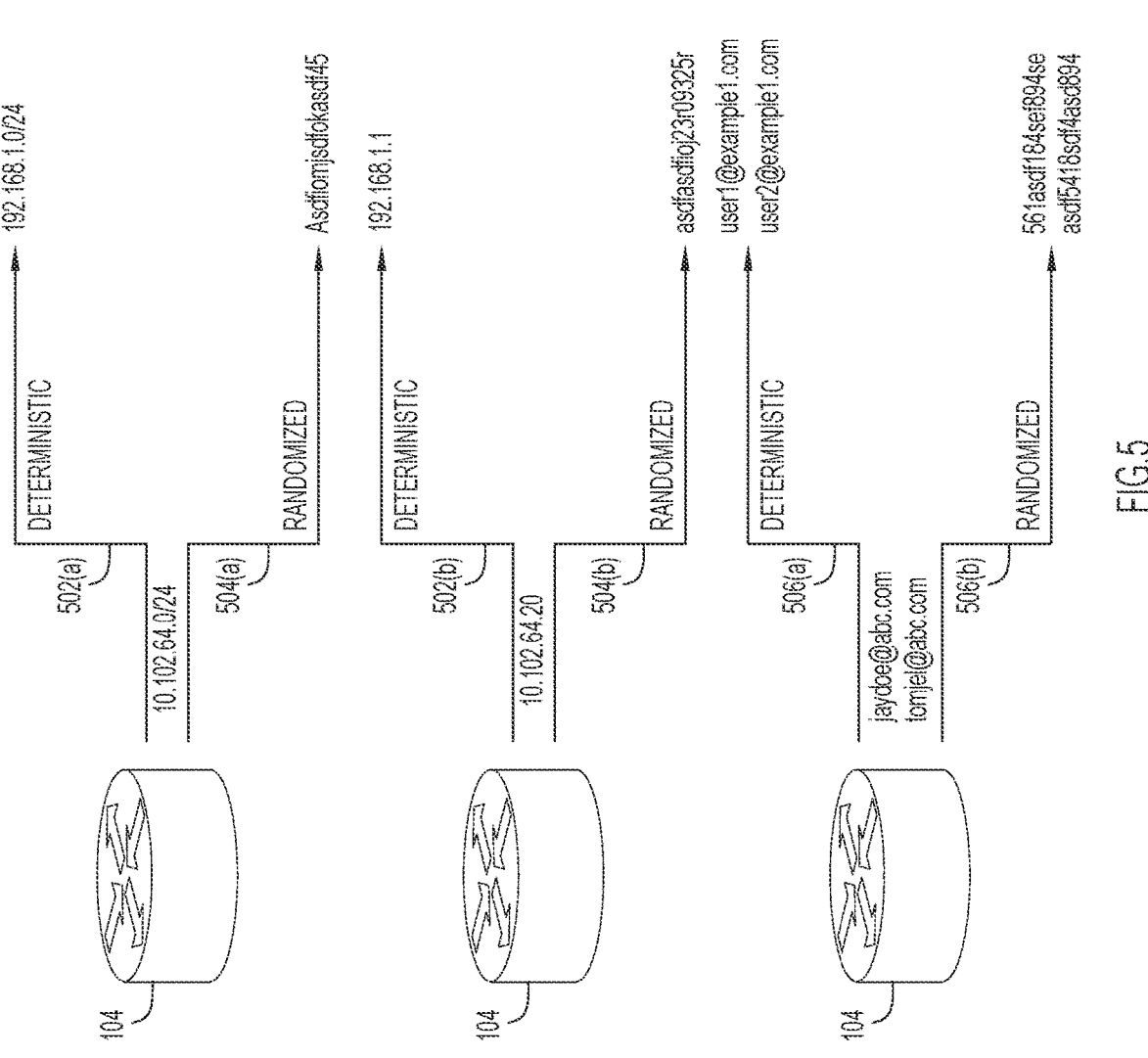
FIG. 5 is an illustration of different methods of obfuscating data, according to an example embodiment.

FIG. 5 is an illustration of example methods 500 of obfuscating data that are mentioned above. At 502(*a*) and 502(*b*), target device 104 deterministically obfuscates two IP addresses 10.102.64.0/24 and 10.102.64.20 similarly to hide their specific full values but retain some similarity/relatedness in their obfuscated outcomes, e.g., 10.102.64.→192.168.1, as shown. In contrast, at 504(*a*) and 504(*b*), target device 104 randomizes the two IP address values to randomized outcomes. At 506(*a*), target device 104 deterministically obfuscates email addresses in the same domain to obfuscated email addresses in the same obfuscated domain. At 506(*b*), target device 104 randomizes the email addresses.

FIG. 6 is a flowchart of an example method 600 of bidirectional data obfuscation and atomization within a network runtime environment performed primarily at analysis server 102.

At 602, the method identifies data objects used by logic configured to produce alternative outcomes depending on first values of the data objects. Initially, the first values are unknown.

At 604, the method obfuscates the data objects to produce obfuscated data objects that are related to, but do not identify, the data objects.

At 606, the method creates distinct individual mappings that map the data objects to the obfuscated data objects, respectively. The method stores the individual mappings locally (e.g., at the analysis server).

At 608, the method creates individual requests for second values of the obfuscated data objects (one individual request per obfuscated data object) and populates the individual requests with corresponding ones of the individual mappings (which uniquely maps the individual requests to corresponding ones of the data objects/obfuscated data objects). The method sends, to a target device, the individual requests for the second values of the obfuscated data objects. The method may also create, and send to the target device, spurious requests for spurious data objects to further obfuscate the data objects.

At 610, the method receives, from the target device, individual responses to the individual requests. The individual responses include obfuscated second values produced by the target device from the second values retrieved by the target device. The obfuscated second values are related to (e.g., deterministically related to), but do not specifically identify, the second values. The individual responses also include the individual mappings from the individual requests that are satisfied by the individual responses, respectively.

At 612, the method links the obfuscated second values returned by the individual responses to the data objects using the individual mappings, respectively.

At 614, the method evaluates the logic using the obfuscated second values in place of the first values based on the linking, and without de-obfuscating the obfuscated second values, to produce one of the alternative outcomes. The method ignores any spurious values returned in spurious responses to the spurious requests.

FIG. 7 is a flowchart of an example method 700 of bidirectional data obfuscation and atomization within a network runtime environment performed primarily at target device 104.

At 702, the method receives, from an analysis server, individual requests for values of obfuscated data objects and that respectively include (i) individual request identifiers/individual mappings, and (ii) indicate obfuscation methods (e.g., deterministic, random, or none). At 704, the method retrieves values for the obfuscated data objects and obfuscates the values according to the obfuscation methods.

In one example, the method obfuscates the values deterministically, not randomly, such that different second values produce different obfuscated values, but multiple instances of a given second value produces a same obfuscated value. Obfuscation may include adding a common offset to same values, or translation and replacement, for example. Obfuscation may also include mapping Boolean true/false values to integer ranges, e.g., true/false→range of 55123-56000/56001-57245, where the Boolean true/false mapping is shared between the target device and the analysis server.

At 706, the method sends, to the analysis server, individual responses to the individual requests. The individual responses include the obfuscated values and the identifiers/mappings as copied from the individual requests.

The embodiments presented herein provide techniques by which a vendor can securely push individual logical constructs of IC to a customer device (e.g., target device 104) without risking exposure of the IC, as well as providing a means for the customer device to provide specific diagnostic data without the risk of exposing sensitive details. The embodiments achieve advantages including: analysis server 102 does not send IC logic to target device 104, which protects the competitive advantage of the IC logic. The analysis server does not receive sensitive data from the target device, thus abiding by data protection requirements for PII type data. The analysis server can process obfuscated data returned by the target device to provide a contextually relevant answer to IC logic without de-obfuscating the obfuscated data to recover the original raw data. The analysis server does not exchange significant data volumes with the target device in order to complete analysis on the exchanged data.

Figure 8:
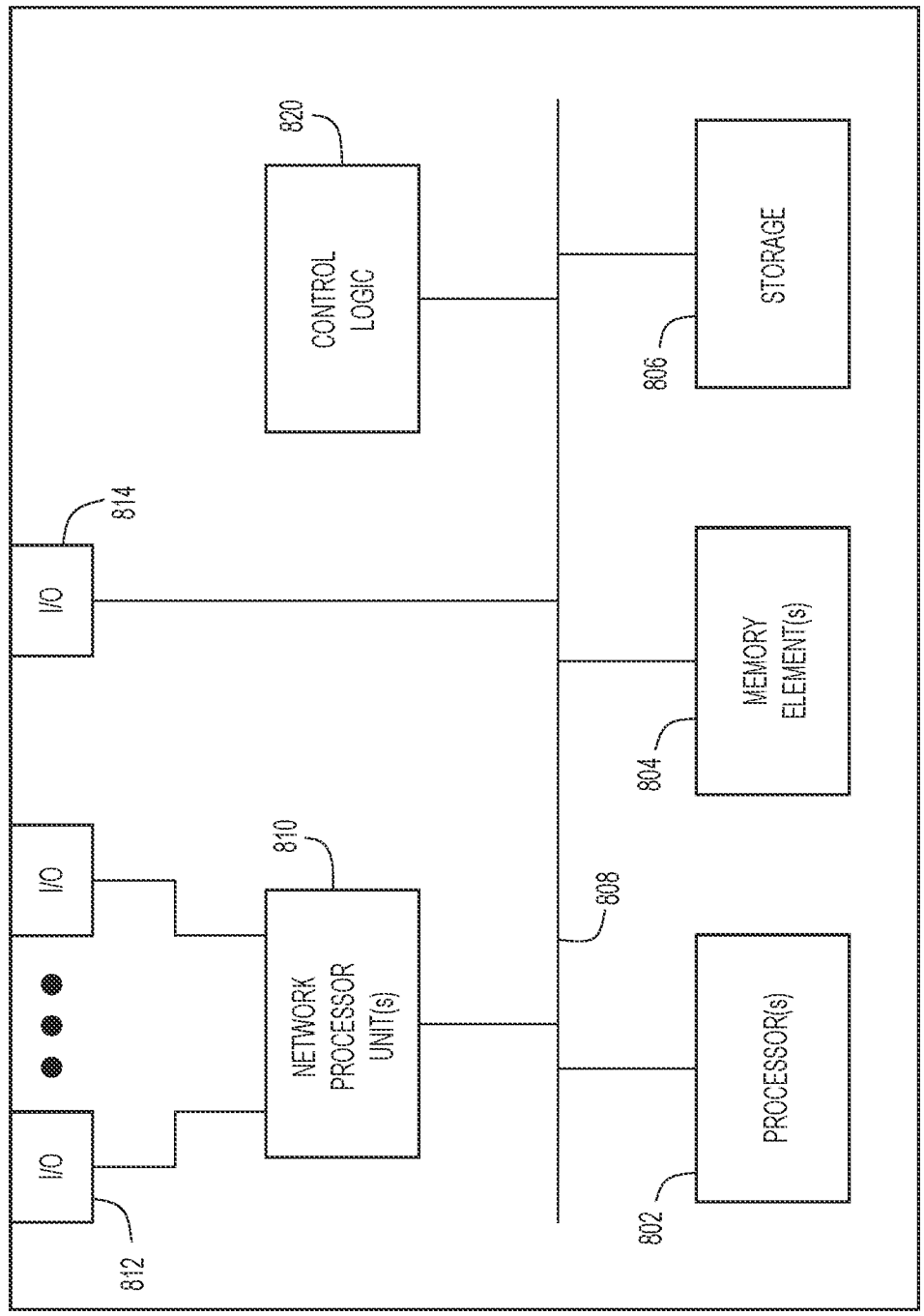
FIG. 8 illustrates a hardware block diagram of a computing device that may perform functions associated with operations discussed herein, according to an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device or apparatus, such as computing device 800 or any combination of computing devices 800, may be configured as any entity/entities as discussed for the techniques depicted in connection with FIGS. 1-7 in order to perform operations of the various techniques discussed herein. For example, computing device 800 may represent analysis server 102 and/or target device 104.

In at least one embodiment, the computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/ antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, data-grams, and/or any other generic units that may be used to transmit communications in a network environment. Gen-erally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, compo-nents, engines, logic, steps, operations, functions, charac-teristics, etc.) included in 'one embodiment', 'example embodiment', 'an embodiment', 'another embodiment', 'certain embodiments', 'some embodiments', 'various embodiments', 'other embodiments', 'alternative embodi-ment', and the like are intended to mean that any such features are included in one or more embodiments of the present disclosure, but may or may not necessarily be combined in the same embodiments. Note also that a mod-ule, engine, client, controller, function, logic or the like as used herein in this Specification, can be inclusive of an executable file comprising instructions that can be under-stood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distin-guish the particular nouns they modify (e.g., element, con-dition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method performed at an analysis server, comprising: identifying data objects used by logic config-ured to produce alternative outcomes depending on first values of the data objects; obfuscating the data objects to produce obfuscated data objects that are related to, but do not identify, the data objects; sending, to a target device, individual requests for second values of the obfuscated data objects; receiving, from the target device, individual responses to the individual requests, wherein the individual responses include obfuscated second values that are related to but do not identify the second values; and evaluating the logic using the obfuscated second values in place of the first values, and without de-obfuscating the obfuscated second values, to produce one of the alternative outcomes.

In some aspects, the techniques described herein relate to a method, further including: creating individual mappings that map the data objects to the individual requests; and upon receiving the individual responses, linking the obfuscated second values returned by the individual responses to the data objects using the individual mappings, wherein evalu-ating includes evaluating the logic using the obfuscated second values as linked to the first values.

In some aspects, the techniques described herein relate to a method, wherein: sending includes sending the individual requests to include the individual mappings; and receiving includes receiving the individual responses to include the individual mappings.

In some aspects, the techniques described herein relate to a method, wherein: the second values are obfuscated deter-ministically, not randomly, such that different second values produce different obfuscated values, but multiple instances of a given second value produces a same obfuscated value.

In some aspects, the techniques described herein relate to a method, wherein: the second values are obfuscated deterministically by one of (i) adding an offset to the second values, (ii) when the second values include Internet Protocol (IP) addresses (IP addresses), translating the IP addresses to different IP addresses, and (iii) replacing each second value with mapped versions of the second values that are consistent.

In some aspects, the techniques described herein relate to a method, wherein: sending includes sending each individual request to indicate an obfuscation method to be used by the target device to obfuscate a corresponding second value.

In some aspects, the techniques described herein relate to a method, further including, at the analysis server: selecting the obfuscation method from multiple obfuscation methods including deterministic obfuscation, random obfuscation, and null obfuscation.

In some aspects, the techniques described herein relate to a method, wherein: The method of obfuscation includes deterministic obfuscation, not random obfuscation.

In some aspects, the techniques described herein relate to a method, further including, at the analysis server: generating an individual spurious request for a spurious value of a spurious object that is not used by the logic; sending the individual spurious request to the target device; and upon receiving, from the target device, an individual spurious response that includes the spurious value, ignoring the spurious value.

In some aspects, the techniques described herein relate to an apparatus including: one or more network processor units to communicate over one or more networks; and a processor coupled to the one or more network processor units and configured to perform: identifying data objects used by logic configured to produce alternative outcomes depending on first values of the data objects; obfuscating the data objects to produce obfuscated data objects that are related to, but do not identify, the data objects; sending, to a target device, individual requests for second values of the obfuscated data objects; receiving, from the target device, individual responses to the individual requests, wherein the individual responses include obfuscated second values that are related to but do not identify the second values; and evaluating the logic using the obfuscated second values in place of the first values, and without de-obfuscating the obfuscated second values, to produce one of the alternative outcomes.

In some aspects, the techniques described herein relate to an apparatus, wherein the processor is further configured to perform: creating individual mappings that map the data objects to the individual requests; and upon receiving the individual responses, linking the obfuscated second values returned by the individual responses to the data objects using the individual mappings, wherein the processor is configured to perform evaluating by evaluating the logic using the obfuscated second values as linked to the first values.

In some aspects, the techniques described herein relate to an apparatus, wherein: the individual requests include the individual mappings; and the individual responses include the individual mappings.

In some aspects, the techniques described herein relate to an apparatus, wherein: the second values are obfuscated deterministically, not randomly, such that different second values produce different obfuscated values, but multiple instances of a given second value produces a same obfuscated value.

In some aspects, the techniques described herein relate to an apparatus, wherein: each individual request is configured to indicate an obfuscation method to be used by the target device to obfuscate a corresponding second value.

In some aspects, the techniques described herein relate to an apparatus, wherein the processor is further configured to perform: selecting the obfuscation method from multiple obfuscation methods including deterministic obfuscation, random obfuscation, and null obfuscation.

In some aspects, the techniques described herein relate to an apparatus, wherein the processor is further configured to perform: generating an individual spurious request for a spurious value of a spurious object that is not used by the logic; sending the individual spurious request to the target device; and upon receiving, from the target device, an individual spurious response that includes the spurious value, ignoring the spurious value.

In some aspects, the techniques described herein relate to a non-transitory computer readable medium encoded with instructions that, when executed by a processor, causes the processor to perform: identifying data objects used by logic configured to produce alternative outcomes depending on first values of the data objects; obfuscating the data objects to produce obfuscated data objects that are related to, but do not identify, the data objects; sending, to a target device, individual requests for second values of the obfuscated data objects; receiving, from the target device, individual responses to the individual requests, wherein the individual responses include obfuscated second values that are related to but do not identify the second values; and evaluating the logic using the obfuscated second values in place of the first values, and without de-obfuscating the obfuscated second values, to produce one of the alternative outcomes.

In some aspects, the techniques described herein relate to a non-transitory computer readable medium, further including instructions to cause the processor to perform: creating individual mappings that map the data objects to the individual requests; and upon receiving the individual responses, linking the obfuscated second values returned by the individual responses to the data objects using the individual mappings, wherein the instructions to cause the processor to perform evaluating include instructions to cause the processor to perform evaluating the logic using the obfuscated second values as linked to the first values.

In some aspects, the techniques described herein relate to a non-transitory computer readable medium, wherein: the individual requests include the individual mappings; and the individual responses include the individual mappings.

In some aspects, the techniques described herein relate to a non-transitory computer readable medium, wherein: the second values are obfuscated deterministically, not randomly, such that different second values produce different obfuscated values, but multiple instances of a given second value produces a same obfuscated value.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed at an analysis server, the method comprising:

identifying data objects used by logic configured to produce alternative outcomes depending on first values of the data objects;

obfuscating the data objects to produce obfuscated data objects that are related to, but do not identify, the data objects;

creating individual mappings that map the data objects to individual requests for second values of the obfuscated data objects;

sending the individual requests to a target device;

receiving, from the target device, individual responses to the individual requests, wherein the individual responses include obfuscated second values that are related to but do not identify the second values;

linking the obfuscated second values to the data objects using the individual mappings; and evaluating the logic using the obfuscated second values that are linked to the first values in place of the first values, and without de-obfuscating the obfuscated second values, to produce one of the alternative outcomes.

2. The method of claim 1, wherein:

the analysis server and the target device collectively implement an analysis runtime environment that employs intellectual capital.

3. The method of claim 1, wherein:

sending includes sending the individual requests to include the individual mappings; and receiving includes receiving the individual responses to include the individual mappings.

4. The method of claim 1, wherein the second values are obfuscated deterministically, not randomly, such that different second values produce different obfuscated values, but multiple instances of a given second value produce a same obfuscated value.

5. The method of claim 4, wherein the second values are obfuscated deterministically by one of (i) adding an offset to the second values, (ii) when the second values include Internet Protocol (IP) addresses (IP addresses), translating the IP addresses to different IP addresses, and (iii) replacing each second value with mapped versions of the second values that are consistent.

6. The method of claim 4, wherein sending includes sending each individual request to indicate an obfuscation method to be used by the target device to obfuscate a corresponding second value.

7. The method of claim 6, further comprising, at the analysis server:

selecting the obfuscation method from multiple obfuscation methods including deterministic obfuscation, random obfuscation, and null obfuscation.

8. The method of claim 6, wherein the obfuscation method includes deterministic obfuscation, not random obfuscation.

9. The method of claim 1, further comprising, at the analysis server:

generating an individual spurious request for a spurious value of a spurious object that is not used by the logic;

sending the individual spurious request to the target device; and upon receiving, from the target device, an individual spurious response that includes the spurious value, ignoring the spurious value.

10. An apparatus comprising:

one or more network processor units to communicate over one or more networks; and a processor coupled to the one or more network processor units and configured to perform:

identifying data objects used by logic configured to produce alternative outcomes depending on first values of the data objects;

obfuscating the data objects to produce obfuscated data objects that are related to, but do not identify, the data objects;

creating individual mappings that map the data objects to individual requests for second values of the obfuscated data objects;

sending the individual requests to a target device;

receiving, from the target device, individual responses to the individual requests, wherein the individual responses include obfuscated second values that are related to but do not identify the second values;

linking the obfuscated second values to the data objects using the individual mappings; and evaluating the logic using the obfuscated second values that are linked to the first values in place of the first values, and without de-obfuscating the obfuscated second values, to produce one of the alternative outcomes.

11. The apparatus of claim 10, wherein:

the processor operates as an analysis server, and the analysis server and the target device collectively implement an analysis runtime environment that employs intellectual capital.

12. The apparatus of claim 10, wherein:

the individual requests include the individual mappings; and the individual responses include the individual mappings.

13. The apparatus of claim 10, wherein the second values are obfuscated deterministically, not randomly, such that different second values produce different obfuscated values, but multiple instances of a given second value produce a same obfuscated value.

14. The apparatus of claim 13, wherein each individual request is configured to indicate an obfuscation method to be used by the target device to obfuscate a corresponding second value.

15. The apparatus of claim 14, wherein the processor is further configured to perform:

selecting the obfuscation method from multiple obfuscation methods including deterministic obfuscation, random obfuscation, and null obfuscation.

16. The apparatus of claim 10, wherein the processor is further configured to perform:

generating an individual spurious request for a spurious value of a spurious object that is not used by the logic;

sending the individual spurious request to the target device; and upon receiving, from the target device, an individual spurious response that includes the spurious value, ignoring the spurious value.

17. A non-transitory computer readable medium encoded with instructions that, when executed by a processor, causes the processor to perform:

identifying data objects used by logic configured to produce alternative outcomes depending on first values of the data objects;

obfuscating the data objects to produce obfuscated data objects that are related to, but do not identify, the data objects;

creating individual mappings that map the data objects to individual requests for second values of the obfuscated data objects;

sending the individual requests to a target device;

receiving, from the target device, individual responses to the individual requests, wherein the individual responses include obfuscated second values that are related to but do not identify the second values;

linking the obfuscated second values to the data objects using the individual mappings; and evaluating the logic using the obfuscated second values that are linked to the first values in place of the first values, and without de-obfuscating the obfuscated second values, to produce one of the alternative outcomes.

18. The non-transitory computer readable medium of claim 17, wherein:

the processor is part of an analysis server, and the analysis server and the target device collectively implement an analysis runtime environment that employs intellectual capital.

19. The non-transitory computer readable medium of claim 17, wherein:

the individual requests include the individual mappings; and the individual responses include the individual mappings.

20. The non-transitory computer readable medium of claim 17, wherein the second values are obfuscated deterministically, not randomly, such that different second values produce different obfuscated values, but multiple instances of a given second value produce a same obfuscated value.

\* \* \* \* \*